United States Patent Office

Re. 25,179
Reissued May 29, 1962

25,179

PRODUCTION OF ALKYL ALUMNIUM HYDRIDES AND THEIR COMPLEX COMPOUNDS WITH ALKALI HYDRIDES

Karl Ziegler, Hans Georg Gellert, and Konrad Nagel, Mulheim-Ruhr, Germany; said Gellert and Nagel assignors to said Ziegler No Drawing. Original No. 2,915,541, dated Dec. 1, 1959, Ser. No. 347,604, Apr. 8, 1953. Application for reissue Dec. 20, 1961, Ser. No. 165,057
Claims priority, application Germany Apr. 21, 1952
9 Claims. (Cl. 260—448)

Matter enclosed in heavy brackets [ ] appears in the original patent but forms no part of this reissue specification; matter printed in italics indicates the additions made by reissue.

This invention relates to the production of alkyl aluminium hydrides and their complex compounds with alkali hydrides.

O. Stecher and E. Wiberg have described mixed aluminium hydride methyl compounds in Berichte der Deutschen Chemischen Gesellschaft, vol. 75, pp. 2003–2012 (1942). The process for their preparation consisted in the action of high-frequency electric discharges on mixtures of aluminium trimethyl vapour with hydrogen. This process is not very convenient; moreover it yields a plurality of different products and is out of the question for the technical production of such compounds.

More recently R. S. Brokaw and R. N. Pease have stated in the Journal of the American Chemical Society, 72, p. 3237 (1950), that they obtained diethyl aluminium hydride from aluminium boron hydride and ethylene. This process would be out of the question for the technical production of diethyl aluminium hydride even if, which is not the case, it really led to diethyl aluminium hydride. The properties of pure diethyl aluminium hydride were established for the first time in the course of the development of the present invention. They are quite different from those given by the American authors. The latter must, therefore, have had something else in their hands.

It has now been found that organic aluminium compounds of the general formula AlHXY, in which X represents an alkyl, R, and Y represents hydrogen or an alkyl R, and their complex compounds with alkali hydrides, can be produced by reacting alkyl aluminium dihalides or dialkyl aluminium monohalides with alkali hydrides.

If alkali hydrides, for example sodium hydride, are reacted with dialkyl aluminium halides, for example dialkyl aluminium chloride, dialkyl aluminium hydrides are obtained together with sodium chloride. Alkyl aluminium dihydrides are obtained by the action of alkali hydrides, for example lithium hydride, on alkyl aluminium dihalides, for example alkyl aluminium dichloride.

These reactions are illustrated by the following equations:

$$R_2AlCl+NaH=R_2AlH+NaCl$$

$$RAlCl_2+2LiH=RAlH_2+2LiCl$$

The compounds have similar properties in many respects to aluminium hydride, but are distinguished by greater stability. The stability is particularly pronounced in the case of dialkyl aluminium hydrides. These are readily mobile liquids which are colourless, spontaneously inflammable when of low molecular weight, sensitive to air and moisture and distillable in vacuum or high vacuum, and are very similar in appearance to the aluminium trialkyls. Only dimethyl aluminium hydride is highly viscous. The dialkyl aluminium hydrides do not form stable molecular compounds with ethers.

The alkyl aluminium hydrides are best prepared and kept only in solution, since on concentration they tend to disproportion in accordance with the equation $$2AlRH_2=AlH_3+AlHR_2$$

with precipitation of difficultly soluble $(AlH_3)_x$. In the case of aluminium dialkyl hydrides similar changes may take place at elevated temperature, but the aluminium hydride formed then decomposes at once into aluminium and hydrogen so that the following total reaction takes place:

$$3Al(C_2H_5)_2H=2Al(C_2H_5)_3+1\tfrac{1}{2}H_2+Al$$

The stability, however, depends to a high degree on the absence or presence of traces of catalytically active impurities which have so far not been clearly recognised. As a rule the aluminium dialkyl hydrides in the pure form are stable at least up to 120° C. and to a higher temperature when in solution.

All compounds of the type $R_2AlH$ and $RAlH_2$ can add on one molecule of alkali hydride to form complex compounds of the type $(R_2AlH_2)Na(Li)$ or $(RAlH_3)Na(Li)$ respectively. To prepare the latter substances alkali hydride is advantageously brought together in excess with dialkyl aluminium halides or alkyl aluminium dihalides, whereupon the following reactions take place:

$$R_2AlCl+2LiH=(R_2AlH_2)Li+LiCl$$

$$RAlCl_2+3LiH=(RAlH_3)Li+LiCl$$

From these complex compounds, which are frequently readily soluble in indifferent media, the non-complex basic compounds can be recovered by the action of $R_2AlCl$ or $RAlCl_2$ (thus by a process involving two stages in all):

$$R_2AlH_2Li+ClAlR_2=2R_2AlH+LiCl$$

$$2RAlH_3Li+Cl_2AlR=3RAlH_2+2LiCl$$

As compared to the direct reaction of alkali hydride with alkylated aluminum halide this process has the advantage that it is not necessary in the first phase of the reaction to employ exactly equivalent quantities of the reactants. The difficulties of such a one-stage reaction are obvious: If the reaction is not quite complete the reaction product still contains halogen. If the reaction mixture is boiled for a long time to complete the reaction, this promotes in certain circumstances the decomposition of the mixed alkyl hydride already formed. If on the other hand the hydride is present in slight excess it is indeed easy to obtain halogen-free reaction products. As a consequence, however, non-volatile alkali hydride complex compounds remain behind on vacuum distillation with consequent reduction in yield. All these disadvantages are avoided by the two-stage process. In that case one can use only a small excess of alkali hydride, then determine the alkali content by titration of a sample of the liquid reaction mixture, which has preferably been clarified by centrifuging and has been decomposed with water, and then again add the exactly equivalent quantity of alkyl aluminium halide. It may also be advantageous to begin with the final alkyl aluminium hydrogen compounds, add alkali hydride to these and in this way first convert the alkali hydride into a better soluble form and then add the alkyl aluminium halogen compound in a quantity corresponding to the alkali. By the repetition of these operations large quantities of the hydride and halide are finally reacted.

The products of the process are excellent reducing agents which in many cases are more effective than the known lithium aluminium hydride, more particularly since they can be used at elevated temperature also. They are very suitable for the reduction or the partial reduction of olefins or diolefins by the process described in German patent application Z 1955 IVc/12o. Finally these aluminium compounds, which contain hydrogen as well as alkyl, offer a convenient transition to aluminium trialkyls from the aluminium compounds of the type $AlR_2Cl$ and $AlRCl_2$ which contain alkyl as well as halogen and are readily accessible from metallic aluminium and alkyl halides. Whereas, for example $(C_2H_5)_2AlCl$ could hitherto only be converted into aluminium triethyl by treatment with metallic sodium according to the equation $$3(C_2H_5)_2AlCl+3Na=Al+2(C_2H_5)_3Al$$

with loss of bound aluminium, whilst this process also gave a poor yield, the reaction $$Al(C_2H_5)_2Cl+NaH=Al(C_2H_5)_2H+NaCl$$

$$Al(C_2H_5)_2H+C_2H_4=Al(C_2H_5)_3$$

can be carried out very smoothly. The products of the process of the invention are also excellent polymerisation promoters for ethylene and its homologues by the process of German patent application Z 771 IVc/39c.

EXAMPLE 1

A very fine and uniform suspension of 8.2 g. of lithium hydride in 150 cc. of absolute diethyl ether is first produced by grinding under ether in a ball mill or vibrating ball mill for a considerable time. 120 g. of aluminium diethyl chloride are dissolved in 200 cc. of absolute ether in an atmosphere of nitrogen in a three-necked flask of one-litre content provided with stirrer, dropping funnel and reflux condenser. The lithium hydride suspension is then added drop by drop with stirring. After boiling up the reaction immediately begins and lithium chloride is precipitated. The reaction mixture is then heated for approximately a further ½ hour to gentle boiling. If the stirring is now interrupted the lithium chloride rapidly separates and a small sample of the clear solution can readily be withdrawn. Halogen should no longer be detectable after decomposition with water and the water should react quite weakly alkaline. If necessary a little more lithium hydride or lithium aluminium chloride must be added. A considerable content of alkali at this stage means a decrease in the final yield. Preferably the reaction mixture is now centrifuged in special closable centrifuge vessels in an atmosphere of nitrogen and the clear solution is withdrawn in an atmosphere of nitrogen. The ether is distilled off as gently as possible on a hot water bath and the residue is then rectified under high vacuum. The aluminium diethyl hydride passes over at 55–56° C. under $10^{-3}$ mm. Hg pressure as a water-clear readily mobile liquid: yield approximately 60–70 g. Aluminium content: 31.4% found as calculated. $d_4^{20}=0.808$, $n_D^{20}=1.47396$ (introducted into the refractometer under nitrogen). On decomposition with water 0.3718 g. of this substance gave 276 cc. of gas (calculated 290 cc.) which consisted exactly of ⅔ ethane and ⅓ hydrogen.

EXAMPLE 2

15 g. of lithium hydride coarsely ground under ether are boiled in 250 cc. of ether in the apparatus described in Example 1 with 74 g. of dipropyl aluminium chloride with stirring. Lithium chloride again precipitates and the complex salt $LiAlH_2(C_3H_7)_2$ goes into solution. The alkali content (determined on a sample after decomposition with water) in the solution clarified by standing quietly increases to approximately 2 N and then remains constant. The solution is clarified again by centrifuging, the clear solution is separated under nitrogen and 74 g. of dipropyl aluminium chloride are again added. The last portions are added very cautiously and the solution is frequently tested for halogen or alkali. The working up is similar to Example 1. The aluminium dipropyl hydride boils under very high vacuum at 80° C. If the addition of the second portion of dipropyl aluminium chloride is omitted and instead the ethereal solution freed from lithium chloride is evaporated under nitrogen, then a white salt-like residue of the complex compound $LiAlH_2(C_3H_7)_2$ remains behind in practically quantitative yield.

The aluminium dipropyl chloride required for this experiment is preferably prepared from aluminium tripropyl by the addition of aluminium chloride in the molecular ratio 2:1. The aluminium tripropyl can be obtained inter alia from lithium aluminium hydride and 3–6 mols of propylene at 100° C. in the autoclave, by blowing off the excess propylene, dissolving or suspending in hexane the lithium aluminium dipropyl produced and adding ⅓ mol of aluminium chloride Aluminium dihexyl hydride $(C_6H_{13})_2AlH$ was also obtained in analogous manner. The product passes over at 120° C. in an apparatus for short-path distillation under very high vacuum and has the correct analytical composition.

EXAMPLE 3

25 g. of sodium hydride are finely ground, suspended in 100 cc. of octane and added to 120 g. of aluminium diethyl chloride containing no solvent, thereupon the mixture is heated with stirring under nitrogen until a sample of the clear solution, withdrawn after allowing the mixture to settle, no longer contains halogen. The sodium chloride formed separates well in coarsely granular form. The liquid is filtered or centrifuged from the sodium chloride under nitrogen, the octane is removed by distillation under moderately reduced pressure and the diethyl aluminium hydride is isolated as in Example 1.

EXAMPLE 4

50 g. of aluminium tri-isobutyl etherate $$Al(CH_2.CH(CH_3)_3.¾(C_2H_5)_2O$$

(B.P. 58–59° C./$10^{-3}$ mm. Hg, water clear liquid) produced from an ethereal solution of aluminium hydride by careful heating with isobutylene to 60–80° C. in an autoclave, evaporation of the ether under nitrogen and distillation in vacuo, are dissolved in an atmosphere of nitrogen in 150 cc. of air-free absolute ether and 53 g. of anhydrous aluminium chloride dissolved in 200 cc. of absolute ether are added. ⅔ of the isobutyl aluminium [aluminium] dichloride solution obtained are run into a fine suspension of 10 g. of lithium hydride stirred under nitrogen, whereupon with precipitation of lithium chloride a solution of lithium aluminium isobutyl trihydride, $Li(AlH_3i—C_4H_9)$, is formed, which can be recognised by the fact that the ethereal solution, previously clarified by settling, now contains the correct quantity of alkali in solution. If the lithium chloride is now separated by centrifuging (in closed centrifuge vessels filled with nitrogen), a clear solution is obtained to which the unused ⅓ of the isobutyl aluminium dichloride solution is now added. After again separating the lithium chloride which again precipitates a clear solution of isobutyl aluminium dihydride is obtained which can be cautiously concentrated but finally deposits solid insoluble aluminium hydride. Samples of the concentrated but not yet turbid solution give hydrogen and isobutane in the quantitative proportion 2:1 on decomposition with water.

EXAMPLE 5

Di-propyl aluminium chloride (preparation, see Example 2) is heated in hexane in an autoclave under an atmosphere of nitrogen with 3 mols of sodium hydride for 6 hours to 130–140° C. After cooling and settling the clear hexane solution is poured under nitrogen into a glass flask, the salt-like mass remaining in the autoclave is transferred with the same care to the same flask, the material is heated to boiling and the hexane solution is separated while hot. Sodium aluminium dipropyl dihydride in the form of beautiful colourless crystals is obtained on cooling and completely on evaporation (in an atmosphere of nitrogen). The complex sodium aluminium compound is finally obtained in almost quantitative yield by exhaustive extraction with hot hexane of the mass of salt which originally remained undissolved. The salt contains 16.6–16.8% of sodium, 19.4–19.8% of aluminium (theoretical quantities: 16.7% and 19.5% respectively) and on decomposition with water gives a gas which consists of hydrogen and propane in exactly equal proportions.

What we claim is:

1. Process for the production of organic aluminium compounds of the general formula AlHXY, in which X is an alkyl radical and Y is a member selected from the group consisting of alkyl radicals and hydrogen, and their complex compounds with alkali metal hydrides, which comprises reacting an alkyl aluminium halide with at least one mol of about a molar excess of alkali metal hydride per halogen atom of said halide.

[2. As a new chemical compound, an unadulterated specific organic aluminum compound of the general formula AlHXY, in which X and Y are alkyl radicals containing at least 2 carbon atoms.]

[3. As a new chemical compound, an unadulterated specific diethylaluminumhydride.]

[4. As a new chemical compound, an unadulterated specific dipropylaluminumhydride.]

[5. As a new chemical compound, an unadulterated specific isobutylaluminumdihydride.]

[6. As a new chemical compound, an unadulterated specific dihexylaluminumhydride.]

7. Process for the production of alkyl aluminum hydrides which comprises reacting an alkyl aluminum halide with a sufficient amount of an alkali metal hydride to provide at least about one mol of said hydride for each halogen of said halide plus about one mol of said hydride to thereby obtain an alkali metal alkyl aluminum hydride, and thereafter reacting the latter with sufficient alkyl aluminum halide to provide for each alkali metal present in said alkali metal alkyl aluminum hydride substantially molar equivalent amounts of halogen.

8. Process according to claim 7, in which said alkyl aluminum halide is a monoalkyl aluminum dihalide.

9. Process according to claim 8, in which said dihalide is one having a lower alkyl radical of at least two carbon atoms.

10. Process according to claim 7, in which said alkyl aluminum halide is a dialkyl aluminum monohalide.

11. Process according to claim 10, in which said monohalide is one having lower alkyl radicals with at least two carbon atoms each.

12. In the production of alkyl aluminum hydrides, the improvement which comprises reacting an alkali metal alkyl aluminum hydride with sufficient alkyl aluminum halide to provide for each alkali metal present in said hydride substantially molar equivalent amounts of halogen and recovering the alkyl aluminum hydride formed.

13. Process in accordance with claim 7, in which said halide is reacted with said hydride at a temperature up to about 120° C. in the substantial absence of a solvent.

14. Process in accordance with claim 7, in which said halide is reacted with said hydride at a temperature above about 120° C. in the presence of an inert solvent.

References Cited in the file of this patent or the original patent

UNITED STATES PATENTS

| | | |
|---|---|---|
| 2,567,972 | Schlesiger et al. | Sept. 18, 1951 |
| 2,765,329 | Lindsey | Oct. 2, 1956 |

OTHER REFERENCES

Grosse et al.: J. Am. Chem., vol. 5, page 110.
Grosse et al.: J. Organic Chemistry (1940), page 107.
Finholt et al.: J. Am. Chem. Soc., vol. 69, page 1199.